United States Patent
Totolos, Jr.

(10) Patent No.: US 7,380,158 B2
(45) Date of Patent: *May 27, 2008

(54) METHOD AND SYSTEM FOR PROVIDING PERSISTENT STORAGE OF USER DATA

(75) Inventor: George Totolos, Jr., Cranberry Township, PA (US)

(73) Assignee: Spinnaker Networks, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/208,165

(22) Filed: Aug. 19, 2005

(65) Prior Publication Data

US 2006/0031422 A1 Feb. 9, 2006

Related U.S. Application Data

(63) Continuation of application No. 10/274,066, filed on Oct. 17, 2002, now Pat. No. 6,938,184.

(51) Int. Cl.
*G06F 11/00* (2006.01)

(52) U.S. Cl. .......................... 714/6; 714/14

(58) Field of Classification Search ................ 714/14, 714/6; 711/113, 158, 165; 709/237, 219, 709/238
See application file for complete search history.

(56) References Cited

U.S. PATENT DOCUMENTS

| | | | |
|---|---|---|---|
| 5,218,695 A | | 6/1993 | Noveck et al. |
| 5,335,352 A | * | 8/1994 | Yanai et al. .................. 710/51 |
| 5,515,333 A | | 5/1996 | Fujita et al. |
| 5,586,291 A | | 12/1996 | Lasker et al. |
| 5,590,298 A | | 12/1996 | Kawamoto |
| 5,613,155 A | * | 3/1997 | Baldiga et al. ................. 710/5 |
| 5,761,406 A | | 6/1998 | Kobayashi et al. |
| 5,893,140 A | * | 4/1999 | Vahalia et al. ............... 711/118 |
| 6,295,577 B1 | | 9/2001 | Anderson et al. |
| 6,339,787 B1 | | 1/2002 | Yohe et al. |
| 6,389,508 B1 | | 5/2002 | Tamura |

(Continued)

FOREIGN PATENT DOCUMENTS

EP 0778526 A 6/1997

(Continued)

*Primary Examiner*—Christopher McCarthy
(74) *Attorney, Agent, or Firm*—Ansel M. Schwartz

(57) ABSTRACT

A file server for serving data of a client from a network. The server includes disk means for storing the data. The server includes means for receiving the data from the network and sending an acknowledgment that the data has been stored to the client through the network but before the data has been stored in the disk means, the receiving means in communication with the disk means. The server includes a memory for storing the data until the data is stored in the disk means, the receiving means is in communication with the memory. The server includes a first power source for provide electricity to the disk means, the memory and the receiving means, the first power source in electrical communication with the disk means, the memory and the receiving means. The server includes a second power source that provides electricity to the memory when the first power source fails, the second power source in communication with the memory. A method for serving data of a client from a network.

22 Claims, 4 Drawing Sheets

U.S. PATENT DOCUMENTS

| | | |
|---|---|---|
| 6,606,694 B2 | 8/2003 | Carteau |
| 2002/0156983 A1 | 10/2002 | Jones et al. |
| 2004/0139167 A1 | 7/2004 | Edsall et al. |
| 2004/0153736 A1* | 8/2004 | Viswanathan et al. ......... 714/6 |
| 2005/0044447 A1* | 2/2005 | Dunstan ...................... 714/14 |
| 2005/0102554 A1* | 5/2005 | Zohar et al. .................... 714/6 |
| 2005/0223163 A1* | 10/2005 | Ogasawara et al. ......... 711/112 |
| 2005/0289393 A1* | 12/2005 | Bibikar et al. ................ 714/14 |
| 2006/0059385 A1* | 3/2006 | Atri et al. ..................... 714/14 |
| 2006/0271815 A1* | 11/2006 | Mizuno et al. ................. 714/6 |
| 2006/0277381 A1* | 12/2006 | Meiri et al. ................. 711/165 |

FOREIGN PATENT DOCUMENTS

WO    WO 92/15933 A    9/1992

* cited by examiner

METHOD AND SYSTEM FOR PROVIDING PERSISTENT STORAGE OF USER DATA

This application is a continuation of application Ser. No. 10/274,066 filed on Oct. 17, 2002 now U.S. Pat. No. 6,938,184.

FIELD OF THE INVENTION

The present invention is related to the storage of data when power fails. More specifically, the present invention is related to the storage of data when power fails that utilizes a secondary power source and a private list to ensure data is not incorrectly overwritten when the power returns.

BACKGROUND OF THE INVENTION

An important metric in the performance of a file server is the time it takes to process a client request. A superior server will respond to client requests in the shortest amount of time. In the case of writes to the filesystem, a server is not permitted to acknowledge the request until it can guarantee that all user data will eventually make it to the disk array. If that data is stored in volatile memory within the server, a power outage would cause the complete loss of write data, violating its data integrity guarantees. Attaching the server to an uninterruptible power supply for any useful amount of time may be cost and space prohibitive.

The present invention guarantees that committed user data from all clients will eventually make it to disk, even if power to the system is interrupted for an extended period of time. It does not require any system-scale battery devices. Instead, only a small bank of battery-backed memory is used for persistent storage in the system.

SUMMARY OF THE INVENTION

The present invention pertains to a file server for serving data of a client from a network. The server comprises disk means for storing the data. The server comprises means for receiving the data from the network and sending an acknowledgment that the data has been stored to the client through the network but before the data has been stored in the disk means, the receiving means in communication with the disk means. The server comprises a memory for storing the data until the data is stored in the disk means, the receiving means is in communication with the memory. The server comprises a first power source for provide electricity to the disk means, the memory and the receiving means, the first power source in electrical communication with the disk means, the memory and the receiving means. The server comprises a second power source that provides electricity to the memory when the first power source fails, the second power source in communication with the memory.

The present invention pertains to a method for serving data of a client from a network. The method comprises the steps of receiving the data from the network at a file server powered by a first power source. There is the step of sending an acknowledgment to the client that the data has been stored in a disk array of the server through the network but before the data has been stored in the disk array. There is the step of storing the data in a memory that is powered by a second power source when the first power source fails so the data will not be lost if the first power source fails until the data is stored in the disk array. There is the step of storing the data in the disk array.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
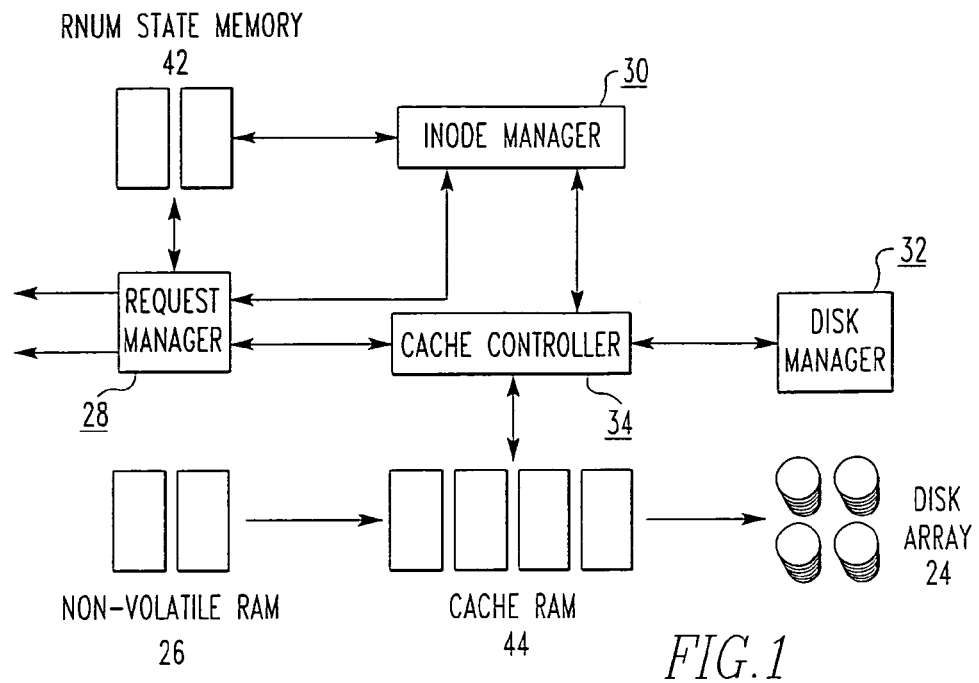
FIG. 1 is a block diagram of file system functional units.
Figure 4:
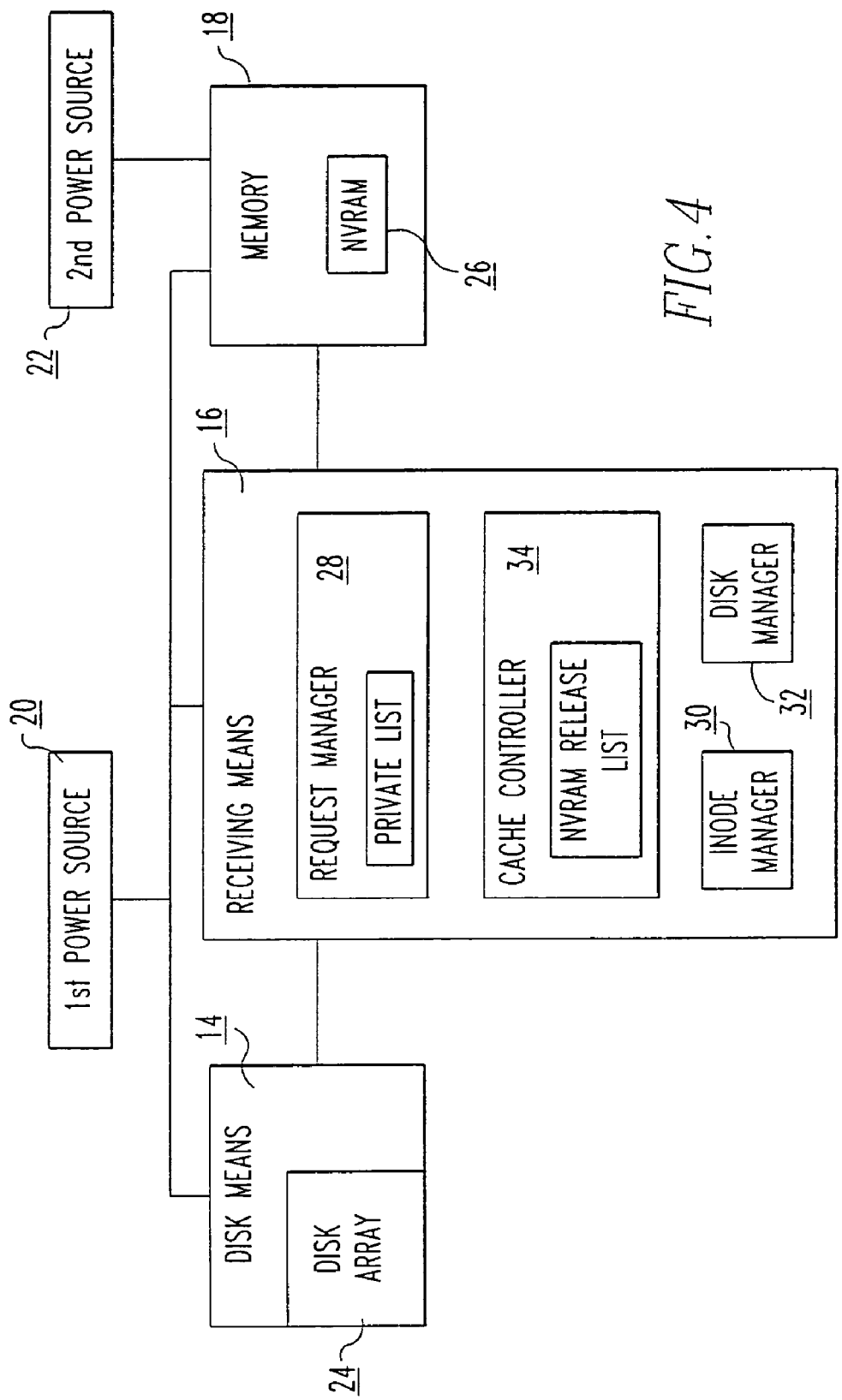
FIG. 4 is a schematic representation of a filesystem of the present invention.

Referring now to the drawings wherein like reference numerals refer to similar or identical parts throughout the several views, and more specifically to FIGS. 1 and 4 thereof, there is shown a file server 10 for serving data of a client from a network 12. The server 10 comprises disk means 14 for storing the data. The server 10 comprises means for receiving the data from the network 12 and sending an acknowledgment that the data has been stored to the client through the network 12 but before the data has been stored in the disk means 14, the receiving means 16 in communication with the disk means 14. The server 10 comprises a memory 18 for storing the data until the data is stored in the disk means 14, the receiving means 16 is in communication with the memory 18. The server 10 comprises a first power source 20 for provide electricity to the disk means 14, the memory 18 and the receiving means 16, the first power source 20 in electrical communication with the disk means 14, the memory 18 and the receiving means 16. The server 10 comprises a second power source 22 that provides electricity to the memory 18 when the first power source 20 fails, the second power source 22 in communication with the memory 18.

Preferably, the receiving means 16 receives data in any order from the client and prevents the data from being incorrectly overwritten in the memory 18 when the data has been received out of order, and the first power source 20 has failed before the data is stored in the memory 18. The disk means 14 preferably includes a disk array 24. Preferably, the memory 18 includes NVRAM 26. The receiving means 16 preferably includes a request manager 28 which separates the write data from other information received from a client and sends that data to the NVRAM 26.

Preferably, the request manager 28 has a private list that identifies the data in the order a write request from a client is completed by the receiving means 16. The private list is used by the request manager 28 to ensure the data is restored in the order in the memory 18 even if the requests were processed out of order, and the first power source 20 has failed before the data is written to the disk array 24. The receiving means 16 preferably includes an inode manager 30 that processes requests from clients. Preferably, receiving means 16 includes a disk manager 32 which manages the disk array 24 and writes or reads the data to or from the disk array 24. The receiving means 16 preferably includes a cache controller 34 which manages at least portions of files stored in the memory 18 means but not saved in the disk array 24.

Preferably, the NVRAM 26 holds a tail of a log file disposed in the disk array 24 which tracks all changes to file system metadata to assure proper reconstruction of the data when there is a failure of the first power source 20. The NVRAM 26 preferably comprises NVRAM buffers 36, NVRAM descriptors 38 and a restoration register 40. Preferably, the NVRAM buffers 36 store the data as it is received from a client; the NVRAM descriptors 38 record information relevant to the recovery of data in its associated NVRAM buffer 36; the free list of NVRAM buffers 36; and the restoration register 40 holds a head and count of the free list. The second power source 22 preferably includes a battery.

Preferably, the request manager 28 assigns a request number to a file system request that is received by the receiving means 16 from the client from the network 12, the request number identifies the request. The receiving means preferably includes request number state memory and other information preferably includes call parameters and file names and the request manager 28 sends the call parameters and the file names to the request number state memory 42 and sends a message to the inode manager 30 that the request is ready for processing. Preferably, the request manager 28 and the inode manager 30 operate independently of each other so the request manager 28 can continue receiving requests from clients while the inode manager 30 is processing requests.

The inode manager 30 preferably begins processing the request by reading the call parameters of the request from the request number state memory 42 to determine what type of operation is requested by the request. Preferably, the receiving means includes cache RAM and the cache controller 34 receives lookup messages from the inode manager 30 and the disk manager 32 that cause the cache controller 34 to search the cache state tables disposed in the cache RAM 44 for the data block requested, fetch the current data associated with the data block from the disk array 24 and returns the cache pointer to the cache state tables identifying where the write data was placed; and fetch messages that contain a cache pointer and instructions on what is to be done with the state of the associated cache block. When the inode manager 30 sends a message to the request manager 28 to copy the write data from NVRAM buffers 36 to specific data blocks in the cache RAM 44, the inode manager 30 preferably sends a change message to the cache controller 34 that the data block has changed and must be written to the disk array 24.

Preferably, the disk manager 32 transfers write data from a cache pointer to a disk block after issuing a fetch message to the cache controller 34 which locks the associated cache pointer, temporarily preventing modification. The cache controller 34 preferably stores an NVRAM 26 release list which links together NVRAM buffers 36 that need to be released when a cache block is cleaned. Preferably, wherein the NVRAM descriptor 38 tracks a first portion and a second portion of data in its NVRAM buffer 36 that are stored in different cache blocks.

The present invention pertains to a method for serving data of a client from a network 12. The method comprises the steps of receiving the data from the network 12 at a file server 10 powered by a first power source 20. There is the step of sending an acknowledgment to the client that the data has been stored in a disk array 24 of the server 10 through the network 12 but before the data has been stored in the disk array 24. There is the step of storing the data in a memory 18 that is powered by a second power source 22 when the first power source 20 fails so the data will not be lost if the first power source 20 fails until the data is stored in the disk array 24. There is the step of storing the data in the disk array 24.

Preferably, the receiving step includes the step of receiving the data out of order; and the storing step includes the step of preventing the data from being incorrectly overwritten in the memory 18 when the data has been received out of order, and the first power source 20 has failed before the data is stored in the memory 18. The receiving step preferably includes the step of maintaining a private list by a request manager 28 of the server 10 that identifies the data in the order a write request is completed by the server 10 and is used by the request manager 28 to ensure data is restored in the order in the memory 18 even if the requests were processed out of order, and the first power source 20 has failed before the data is written to the disk array 24.

Preferably, the storing the data in the memory 18 step includes the step of storing write data in NVRAM 26. The receiving step preferably includes the step of separating the write data from other information received from the client through the network 12.

Preferably, the receiving step includes the steps of assigning a request number to a request associated with the data and dequeuing enough NVRAM buffers 36 to hold the write data.

There is preferably the step of dequeuing by a request manager 28 of the server 10 an NVRAM 26 pointer from a head of a free list; reading a descriptor of the NVRAM 26 to check the state of the NVRAM buffer 36 the descriptor represents. Preferably, there are the steps of zeroing out by the request manager 28 state bits of the descriptor as long as neither a primary cache block or a secondary cache block of the cache RAM 44 of the server 10 associated with the NVRAM 26 is in a protected state; copying by the request manager 28 a next pointer field of the descriptor to a restoration register 40, and retaining the next pointer field in the descriptor in case the first power source 20 is interrupted before the restoration register 40 has been updated. The storing write data step preferably includes the steps of writing the write data to the NVRAM buffers 36 and storing buffer pointers to the respective NVRAM buffers 36 in a request number state memory 42.

Preferably, there is the steps of notifying an inode manager 30 of the server 10 by the request manager 28 that the request number has been assigned to the request; protecting the NVRAM buffers 36 holding the write data of the request; and permitting the inode manager 30 to issue the acknowledgment to the client to the request from the client. The protecting step preferably includes the step of looking with the inode manager 30 into pointer fields of the request number state memory 42 to determine which NVRAM buffers 36 are being used to hold the write data for the request; generating a physical address for each pointer field for the NVRAM descriptor 38; writing with the inode manager 30 the descriptor into the NVRAM buffers 36; and setting the primary and secondary cache blocks to protected. Preferably, there is the step of releasing each dirty cache block with a block release dirty message from the inode manager 30 to the cache controller 34 which identifies which NVRAM buffers 36 must be released when each dirty cache block is released.

There is preferably the step of releasing by the request manager 28 every NVRAM 26 pointer associated with a cache block after it has been cleaned and the request manager 28 has received a block clean response message from the disk manager 32 via the cache controller 34.

Preferably, the releasing step includes the steps of transferring the NVRAM 26 pointer list from the cache controller 34 to the request manager 28; changing with the request manager 28 the state of the primary or secondary portion, as indicated by the cache controller 34, of each NVRAM 26 pointer on the pointer list to the releasing state as the request manager 28 receives the NVRAM 26 pointers while the request manager 28 links the NVRAM 26 pointers together in a private list; determining with the request manager 28 whether the primary or secondary portion of each NVRAM 26 pointer on the private list not indicated by the cache controller 34 is in the protected state; enqueuing the NVRAM 26 pointer as it is received by the request manager 28 to the head of the private list if the primary or secondary portion is in the protected state or to the tail of the private list if neither the primary or secondary portions are protected; appending the private list to the head of the current free list; updating the restoration register 40 to point to the new head of the free list and dequeuing all descriptors that are not in the protected state from the free list.

In the operation of the invention, the File Server is a distributed system of general purpose processors and custom ASICs separated by the function they perform. Integral to the management of these functional units is a message system capable of queuing 32-byte messages to and from any unit in the server. The four functional units involved with the management of filesystem data and its transfer to the disk subsystem are the Request Manager, Inode Manager, Disk Manager and Cache Controller. Each of these entities is capable of sending messages to each other as they process filesystem requests. FIG. 1 shows how these units fit in with each other and the memories that support them. The thick solid lines show the flow of data from the clients to the disk array. The thin dashed lines show communication channels for control of the dataflow.

When a filesystem request arrives from a networked client, it is immediately handled by the Request Manager. Upon receipt of a new request, the Request Manger will assign a Request Number (RNUM) that will be used to identify it throughout processing. The RQM parses each and every filesystem request to separate its call parameters, filenames and write data. While parameters and filenames are sent to RNUM State Memory, all write data present in the call are separated and sent to the Non-Volatile RAM for protection against a power failure. Once parsing is complete, the Request Manager will send a message to the Inode Manager, informing it that a new client request is ready for processing. Because the Request Manager and Inode Manager are separated by a message queuing system, they are free to process their functions without waiting for responses from each other. In other words, the Request Manager is free to process a burst of client requests even if the Inode Manager is stuck on a difficult and slow filesystem operation. The Request Manager is only limited by the maximum number of RNUMs programmed in the system.

The Inode Manager is the central processor of filesystem commands and will dispatch messages to various units to complete its processing. The Inode Manager is informed that a request is waiting through the receipt of a message from the Request Manager. It then begins processing by reading the parameters of the call from RNUM State Memory to determine what type of operation is being requested. This processor is programmed to handle all types of filesystem requests that may arrive from the client. During its processing, the Inode Manager will send messages to the Cache Controller, requesting that Inodes and Data Blocks be fetched from the disk array. It will then use the pointers it receives from the Cache Controller to transfer data to and from Cache RAM as required for the satisfaction of the client request. If it changes the contents of a cache block, the Inode Manager will send a message to the Cache Controller informing this unit that a data block has been updated and must be written back to disk.

The Cache Controller manages portions of the filesystem that are stored in memories that are closer to the client and have much lower latencies than disk arrays. It receives two fundamental types of messages from the Inode Manager and Disk Manager as they process filesystem requests. The first type is a lookup message and causes the cache controller to search the cache state tables for the requested data block, fetch the data from disk if necessary and return the cache pointer to where data was placed. The second type is a fetch message that contains a cache pointer and instructions on what is to be done with the cache pointer state. As different functional units work on cache entries, they take references on them (through cache messages) to assure that they don't get replaced unexpectedly.

The Disk Manager handles messages from the Cache Controller whenever disk activity is requested. When a lookup message has caused a cache miss, the Cache Controller will send a read message to the Disk Manager with a cache pointer where the data should be placed in CacheRAM. When a cache entry has been modified, the Cache Controller will send a write message to the Disk Manager with a cache pointer where the most recent data is located so that it can be written back to disk. In order for the Disk Manager to transfer data from a cache pointer to a disk block, it must first issue a fetch message to the Cache Controller asking for a lock on the pointer. The Disk Manager will only copy data from the cache pointer to the disk array when the lock has been granted. This assures that the contents of the data block are stable before the transfer begins. The Disk Manager sends commands to the Cache Controller to move data from Cache RAM to the disk array. It bases its decisions on the results of algorithms designed to optimize the efficiency of potentially high-latency disks. Aside from tracking dirty pages, its decisions of when to move data out of Cache RAM have little to do with the events occurring on the client side of the system.

As the Request Manager accepts requests from the network, it assigns them a context ID to be used during the lifetime of the request in the server. This ID will be referred to as an RNUM. The RNUM State Memory is used to hold information accumulated during the processing of the request. It is volatile and presumed invalid after a power interruption. The pointers to the NVRAM buffers used to hold incoming client data for the RNUM is stored in this region.

The file server uses Cache RAM to maintain a portion of the filesystem in a low-latency memory close to the clients. While this memory is much faster than the disk array, it generally consumes a lot of power and is therefore implemented as volatile memory, losing all contents during a power outage. The cache controller manages the Cache RAM using a write-back algorithm for improved efficiency. By deferring write-backs to disk, the file server can group data from similar physical locations into one larger write request, improving performance. Because it defers the writeback of data to the disks, the Cache RAM will have a more up-to-date version of the file system than the disk array itself. Therefore, its contents must remain protected by the NVRAM until the write-back has occurred.

Another item stored in Cache RAM is the NVRAM Release List. This memory is used by the cache controller to link together NVRAM buffers that need to be released upon the cleaning of a cache block. A maximum of 64k entries are supported for this function. Each entry is 8 bytes and formatted as follows:

TABLE 1

NVRAM Release Entry (8 Bytes)

| | |
|---|---|
| 4 Bytes | Flags:<br>[31-2]: Reserved.<br>[1]: Clear when the primary portion to be released. Set for secondary.<br>[0]: Set when the Last Entry in the Release List. |
| 2 Bytes | NVRAM Buffer Pointer:<br>The actual NVRAM Buffer Pointer associated with this NVRAM Release Entry. |
| 2 Bytes | Next Entry in Release List:<br>If this entry is not the last one on the list, this field contains a pointer to the next entry on the Release List. |

When the cache controller gets notification of the first NVRAM pointer that requires a Release List, the cache controller will create an entry for it with its flag(0) set to specify that it is the last on the list. Every subsequent pointer that must be placed on the list will be enqueued to the head of the list, pointing to the previous head.

The Non-Volatile RAM (NVRAM) in this system can be implemented using any low power memory technology capable of sustaining write data bandwidth from the client. Its power system must be separated from the rest of the system so a switch to battery backup may occur upon power interruption. The NVRAM has two separate purposes. First, it holds the tail of the log file which tracks all changes to filesystem metadata. As metadata is altered, a transaction of old and new data is kept in the log file to assure proper reconstruction in the event of a server failure. While the majority of the file is kept in the disk array, the most recent transactions are kept in NVRAM as they are appended to the tail of the log file. Once enough transactions have been accumulated, the tail is moved to disk in a large, efficient burst. By having the tail of the log file in fast memory, the filesystem is able to maintain it most efficiently.

Figure 2:
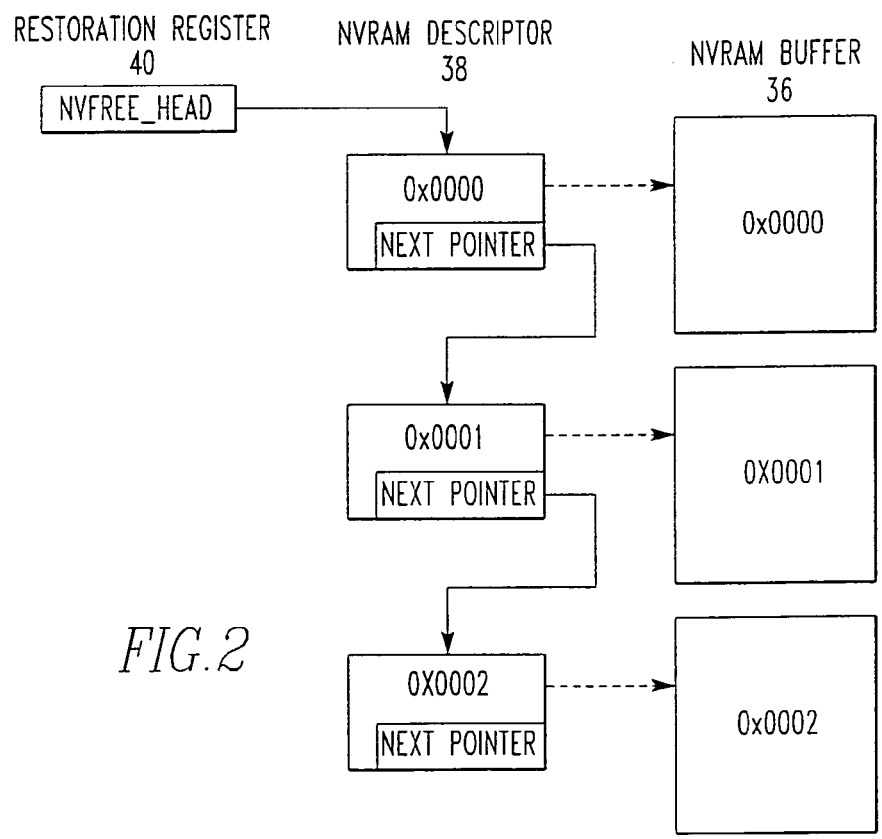
FIG. 2 is a schematic representation of NVRAM write-data buffer structures.

The second use of NVRAM is for the temporary storage of write-data from clients before the system writes it into the disk array. In order to accomplish this task, three separate structures are maintained in the NVRAM. These are the 4 kB NVRAM Buffers, the 32-byte NVRAM Descriptors and the 4-byte Restoration Register. The NVRAM Buffers are used by the server to store the write-data exactly as it arrived from the client. The buffer size of 4 kB was chosen because it matches the size of a disk block and Cache RAM buffer. However, another potential sizing option includes making the buffer equal to the largest transfer of user data possible from the client. Yet another approach would be to offer both small and large sizes to increase the efficiency of memory if many small writes arrive. Each buffer has a single descriptor associated with it to specify all the details of the write-data held in the NVRAM buffer so that it may be reconstructed after a power outage. The descriptors are also used to maintain a free list of buffers that the Request Manager can pull from while it processes client requests. As disk blocks are updated with the write-data from cache blocks, the NVRAM buffers are returned to the end of the free list. The Restoration Register is used to hold the head and count of the free list. FIG. 2 shows how the fileserver tracks NVRAM buffers used to hold write-data from its clients.

Since the server is designed to support up to 64 k NVRAM buffers, a 16-bit pointer is used to identify and reference each buffer and its descriptor. Given that, the Restoration Register merely contains a 16-bit pointer to the descriptor that is at the head of the NVRAM free list and the 16-bit count of the number of descriptors on that free list. The contents of the NVRAM descriptor are very important to the operation of the persistent storage architecture proposed here. This field is initialized upon receipt of write-data and examined during the restoration procedure. The contents of the NVRAM Descriptor are shown in Table 2.

TABLE 2

NVRAM Descriptor (32 Bytes)

| | |
|---|---|
| 12 Bytes | FID:<br>The File ID to which the data in the buffer belongs. |
| 8 Bytes | Offset:<br>The Starting Byte Offset of the data in the file. |
| 8 Bytes | Sequence Number:<br>When the buffer contains data that must be restored, this field contains the sequence number assigned to the request when it arrived. This is used to order incoming writes to assure correctness during recovery. |
| 4 Bytes | State Flags (4 bits):<br>[3-2]: Primary Cache Block State Bits.<br>[1-0]: Secondary Cache Block State Bits.<br>'00': Invalid. Invalid contents.<br>'01': Undefined.<br>'10': Releasing. Restore contents if descriptor is not on free list.<br>'11': Protected. Restore contents under all conditions.<br>Data Length (12 bits):<br>The amount of valid data in the NVRAM buffer.<br>Next Pointer (2 Bytes):<br>When the NVRAM Buffer is on the free list, this field contains the pointer to the next NVRAM buffer on the list. A value of zeroes specifies end of list. |

Figure 3:
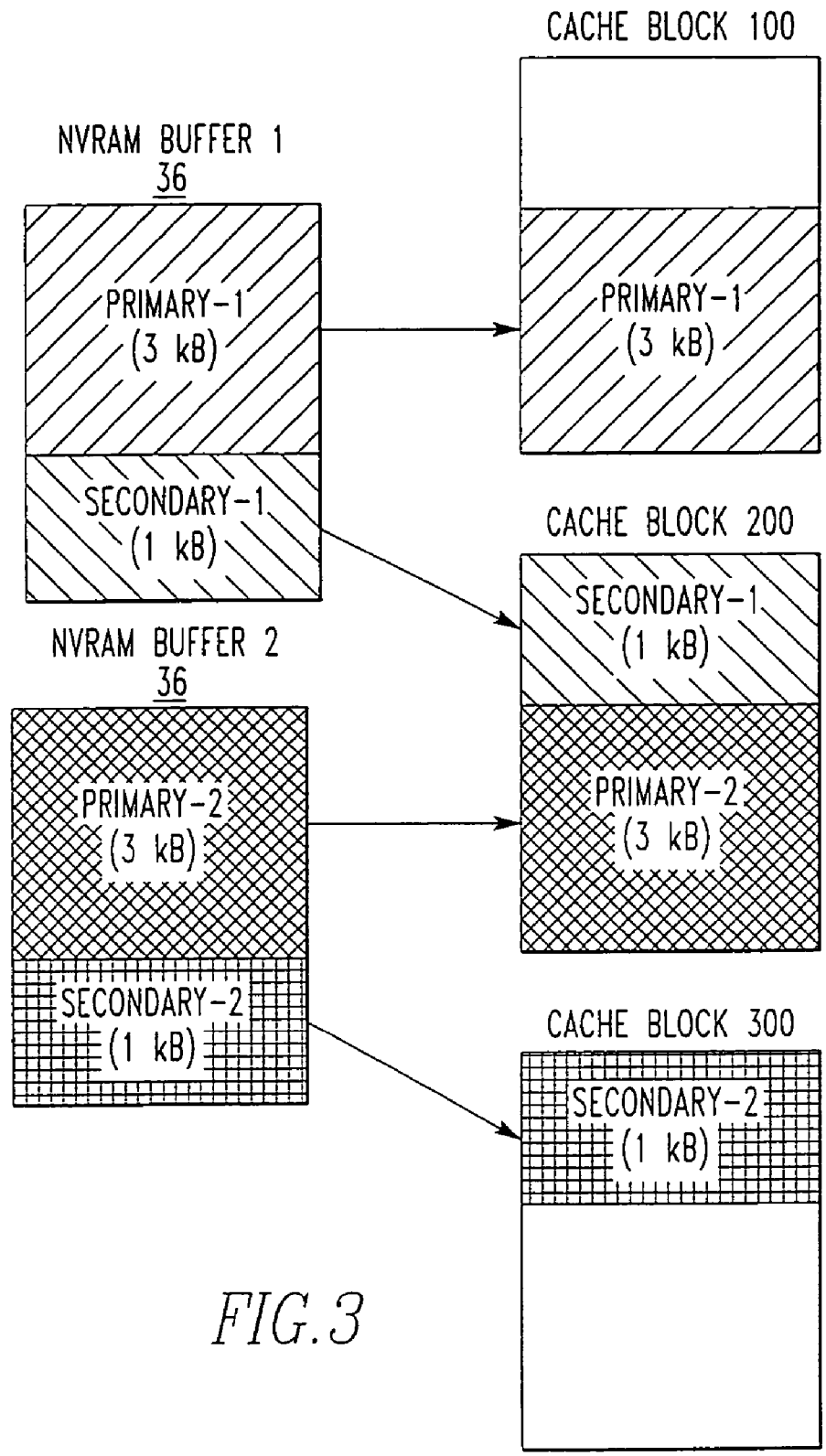
FIG. 3 is a schematic representation of an NVRAM buffer primary/secondary portion visualization.

As indicated in the descriptor, each NVRAM buffer has a primary and secondary portion that may be in different states of protection. For an explanation of this concept, consider the following example. If a client request arrives to the server carrying 8 kB of write data, two 4 kB NVRAM buffers must be prepared for the receipt of that data. If that write data had a starting offset of 1 kB in its file, the full 8 kB of data will ultimately be written to offset 1 kB through 9 kB. Since all cache blocks start a 4 kB boundary, this write data will occupy 3 separate cache blocks before it is written back to the disk array. As shown in FIG. 3, the write data was written to NVRAM buffers 1 and 2. During processing, cache pointers 100, 200 and 300 were obtained and used to receive the write data. Because of the 4 kB boundaries on cache blocks, the NVRAM buffers have virtually been divided into two separate portions, primary and secondary. Cache block 100 holds data from the primary portion of NVRAM buffer 1 while cache block 200 holds data from the secondary portion of NVRAM buffer 1 and primary portion of NVRAM buffer 2 and so on. In the event that cache block 300 is cleaned before the others, the system will know that only the secondary portion of NVRAM buffer 2 may be released, keeping that buffer off the free list and still maintaining protection for the primary portion.

The three phases of operation regarding the maintenance of NVRAM structures during the life of a write request from a client is now described. Each phase outlined below has two subsections. The first subsection describes the steps that the server will go through as it processes the phase. The second subsection provides an analysis of the impact of a power outage that may occur during the phase. This outage analysis is required to assure that power can be lost at any time without compromising the integrity of the NVRAM structures.

Phase 1: User Data Arrival

Description of User Data Arrival

When the fileserver receives a write request from a client, it gets assigned to a dedicated Request Number (RNUM) and is parsed and distributed by the Request Manager. Before it notifies the Inode Manager that the request has arrived, it must first dequeue enough 4 kB NVRAM buffers to hold the entire write data contents. Since the maximum size of a Write Request is 8 kB, no more than two buffers will be required per request.

When the Request Manager dequeues an NVRAM pointer from the head of the free list, it will first read its descriptor to check the state of the buffer it represents. As long as neither the primary nor the secondary cache blocks are in the Protected state, the Request Manager will zero out the state bits in the descriptor. It will then copy the Next Pointer field of the newly dequeued descriptor to the NVFREE_HEAD restoration register since it is the new head of free list. The Next Pointer field is retained in the dequeued descriptor in case power is interrupted before the NVFREE_HEAD register has been updated. If the newly dequeued descriptor were completely zeroed, the free list would have a moment of invalidity until the NVFREE_HEAD restoration register was updated. Putting the NVRAM buffer in the Invalid state will assure that it does not get restored now that it is off the free list.

If the Request Manager finds the state flags of the primary or secondary cache block set to Protected, it will know that the pointer is not fully released and will remove it from the free list altogether. As it removes the descriptor from the free list, it changes any portions in the Releasing state to Invalid to prevent restoration. Consequently, the Next Pointer field of the descriptor will be copied to the NVFREE_HEAD restoration as mentioned above.

The Request Manager will then write the user data to the newly acquired buffers and store pointers to the buffer(s) in a predefined location in RNUM State Memory. Since this client has not received an acknowledgment that the data has been committed, these buffers are not yet protected. If no free NVRAM buffers are available, the client interface of the Request Manager will completely stall until enough come free.

Outage Analysis of User Data Arrival

The only modification to the NVRAM structures during user data arrival is the dequeuing of NVRAM buffers from the head of the free list. During this process, only two structures are updated in a very specific order. First, the state flags of the descriptor are changed from Releasing to Invalid, leaving any Protected portions unchanged. Since no other fields of the descriptor are changing during this operation, a power loss during its update will have no affect on its status. An entry on the free list that is Invalid or Releasing will never be restored by definition. If power is lost after the descriptor is updated but before the NVFREE_HEAD restoration register is updated, the restoration procedure will merely find the recently dequeued descriptor still on the head of the free list and not restore it. Since its next pointer field was unchanged, the integrity of the free list is still maintained.

Phase 2: User Data Committal

Description of User Data Committal

Once the Request Manager notifies the Inode Manager that a new RNUM has been assigned to a write request, the Inode Manager will go through its procedure for this call until it is time to send a response back to the client. Before this response is sent, the Inode Manager must be sure to protect the buffer contents. To accomplish this task, it must first look into pointer fields of the RNUM State Memory to find out which buffer(s) are being used to hold the write data for this request. Only one pointer is valid if the write request was for 4 kB or less. Both pointers are valid for requests larger than 4 kB. The Inode Manager must use each pointer to generate a physical address for the 32-byte NVRAM Descriptor. The Inode Manager must write the entire contents of the descriptor into memory, setting the primary and/or secondary states to Protected. In addition, it must assign an 8-byte sequence number that is one more than the last NVRAM buffer it protected. At this point, the buffers are protected and the Inode Manager is permitted to issue a response to the write request.

When the response has been sent to the client, the Inode Manager will release each dirty cache block with a Block_Release_Dirty message to the cache controller. In this message, the processor must specify which NVRAM buffer(s) must be released when the block is cleaned. Since up to two NVRAM buffers may need to be associated with a single cache block by the Inode Manager, the Block_Release_Dirty call provides enough space to pass these pointers. In addition, this call provides one bit per NVRAM pointer to specify whether the primary or secondary portion of the NVRAM buffer is to be associated with this cache block.

It is important to note that the cache block being assigned the new NVRAM pointers may already be keeping track of others. Therefore, the cache controller is required to keep a list of NVRAM pointers that require release when the cache block is cleaned. To achieve this, the cache controller will maintain a separate pool of 8-byte entries in a region of Cache RAM called the NVRAM Release List. A Block_Release_Dirty calls arrive, the cache controller will form a single linked list of NVRAM buffers in this memory. There must be as many entries in this list as there are NVRAM buffers. This list is called the NVRAM Release List as is kept in Cache RAM.

Phase 3: User Data Release

Outage Analysis of User Data Committal

During this phase, the only changes to NVRAM structures occur when the Inode Manager fills in the NVRAM descriptor(s) to protect the write data. The state bits of the descriptor have been placed in its final word to assure that a state change to Protected would not occur until all other fields were first written. Since the descriptor is in the Invalid state at the beginning of this phase, the descriptor will not be a candidate for recovery until all fields contain valid information.

Description of User Data Release

The reason why a release list of NVRAM buffers is kept behind cache buffers and why the server allows this list to be created in an arbitrary order, even when considering a power loss at any time is now described. In order to allow the server to have various software and hardware modules working independently and simultaneously on the filesystem, there has to be enough flexibility to allow functions to complete out of order. In other words, consider a cache block has a list of NVRAM buffers to release when its contents are finally written to disk. Let's say that this list of buffers was in the following order where the number represents the order in which the data arrived from the client; 1-2-5-4-3. Think of this as saying the client wrote to a file 5 times in a row very quickly and the server processed these requests in a way that the 3rd write was written to the release list last (even though the most recent write data from request #5 is actually in the cache buffer). If power went out before the release list was processed, there would be no problem since the NVRAM would still have all 5 NVRAM buffers, put them in order and assure the most recent data makes it to disk. However, what if the first 3 entries of the release list were removed from NVRAM and then the power went out. When the system came back up, it would see that transfers #3 and #4 were in NVRAM and it would write them out to disk, incorrectly overwriting the most recent data from transfer #5. This problem is solved with the private list maintained by the request manager when releasing buffers.

More specifically, the cache controller is informed when a cache block is cleaned through the use of the Block_Op to clean message. When this call is received, the cache controller will communicate with the Request Manager to release every pointer referenced in the state of the block. Since the fileserver is a multi-threading processing engine, there are no guarantees that the order of released NVRAM buffers is in the same order in which the requests arrived from the network. Therefore, the Request Manager cannot take a simple approach of zeroing out the NVRAM descriptors as it places them on the free list. If power is lost while the chip is returning out-of-order descriptors to the free list, the restoration procedure would think that the older buffers that didn't get freed actually contain the latest data.

To avoid the ordering restriction, the server releases NVRAM buffers in a controlled manner. First, the entire pointer list is transferred from the cache controller to the Request Manager in any order. As the Request Manager receives the pointers, it will change the primary or secondary portion (as indicated by the cache controller) to the Releasing state while it links them together in a private list. If the Request Manager finds that the opposite portion of the NVRAM pointer is still protected, it enqueues the pointer to the head of the private list. Otherwise, it enqueues the pointer to the tail of the private list. After the cache controller sends the entire list of NVRAM pointers to release, the Request Manager will append the new list to the head of the current free list and update the NVFREE_HEAD restoration register to point to the new head. In order to avoid placing an NVRAM pointer on the free list twice, the Request Manager must then dequeue all the descriptors that have protected data from the free list before accepting any further releases from the cache controller. It does this by following the normal dequeue procedure.

Outage Analysis of User Data Release

The first modification of NVRAM structures that occurs during the release process is the creation of the private list. Whenever a pointer is written to the head or tail of the private list, the State Bits are changed to Releasing at the same time that the Next Pointer is updated. During the creation of the private list, there are no changes to the free list at all. Therefore, if power is lost during the private list creation, every NVRAM pointer behind the newly cleaned cache block will be restored whether they made it to the private list or not.

The second modification of NVRAM structures occurs when the private list is moved to the head of the free list. At this time, the Next Pointer of the entry at the tail of the private list is updated to be the current free head. The next step is to update the NVFREE_HEAD restoration register to point to the head of the private list. This effectively moves every newly released NVRAM pointer to the free queue at the same time. If power was lost before the NVFREE_HEAD restoration register was updated, the recovery process would still restore the entire private list since it will not be found on the free list.

Power Loss Procedure

Upon loss of power, the file server will gracefully bring all NVRAM activity to an end. The memory controller sending data to the NVRAM will stop accepting any new requests from the Request Manager and Inode Manager and flush any write-posting buffers that it has. The flush step is important since the Request Manager may have sent a response to the client after the write was accepted by the memory controller but before it actually made it to NVRAM. The memory controller will then follow a shutdown procedure that transfers power supply to the batter backup and places the memory in a low-power mode.

Restoration Procedure

When power is restored to the system, the Request Manager must remain disabled until the entire server is ready to accept new requests. After the normal initialization routine is complete, the Inode Manager is expected to run through every descriptor in the NVRAM to determine which buffers have protected data and in what order they were received.

1. Scan the entire NVRAM descriptor space for all pointers that have a portion of data in the Releasing or Protected state. Place those portions into the Protected List.
2. Read the NVFREE_HEAD restoration register.
3. Follow linked list of free buffers, removing any Releasing portions from Protected List.
4. Scan the entire Protected List and order them by sequence number.

Once the final list of protected data has been determined, the Inode Manager will coordinate with the cache controller to have the current contents of the subject disk blocks read from the disk array into Cache RAM. Then it overwrites those cache blocks with the data stored in the NVRAM buffers, starting at the byte offset indicated in the descriptors. Once all the data has been copied into the cache blocks, it will write that data back to disk, updating the filesystem to the most current version. At this time, the server may now be enabled to receive new network traffic from its clients.

Figure 5:
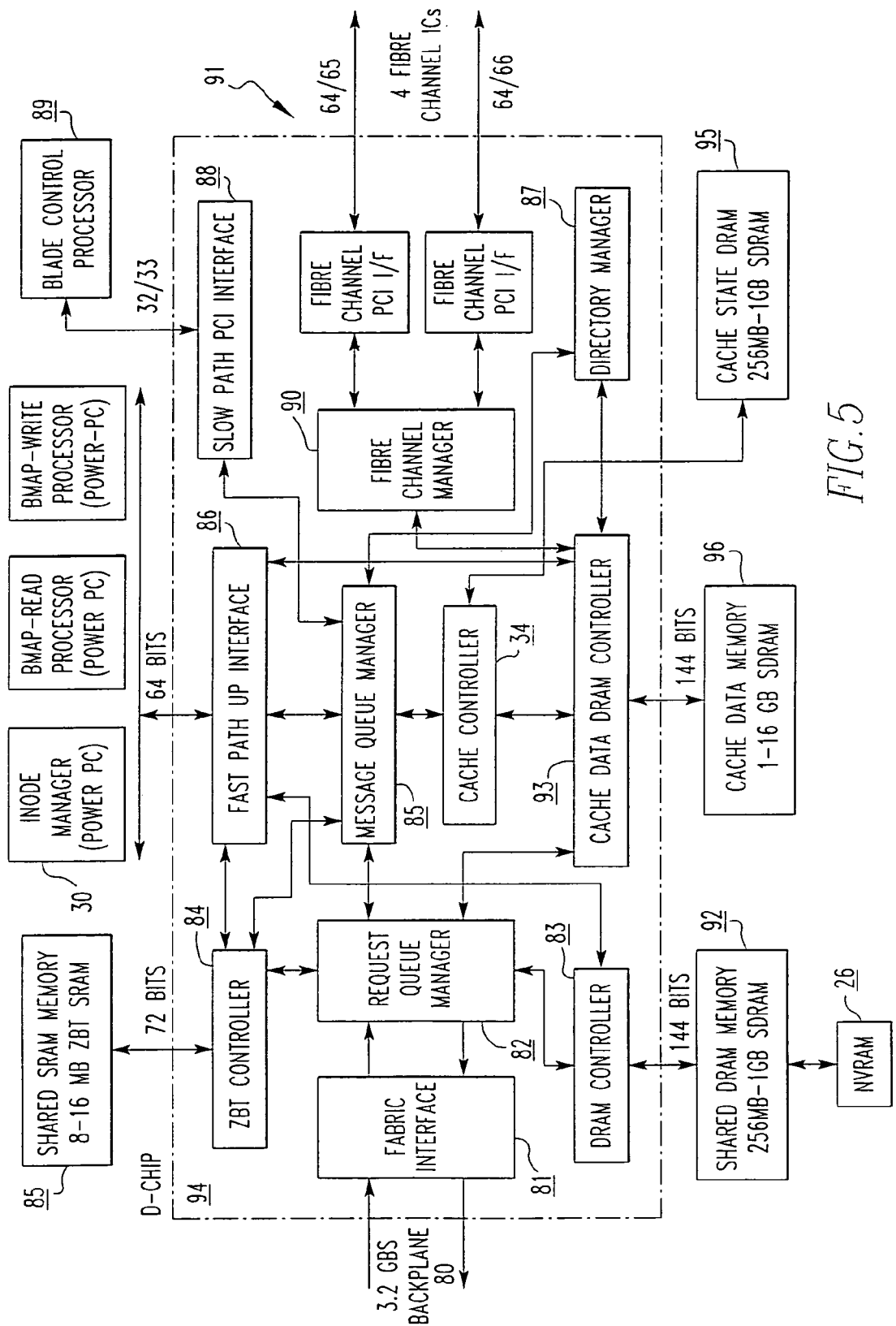
FIG. 5 is a schematic representation of a preferred embodiment of a filesystem of the present invention.

In the preferred embodiment, and as shown in FIG. 5, requests from clients on a 32 Gbps backplane 80 are received by a fabric interface 81 that converts the format of the data that is received from the backplane 80 into a format upon which the request queue manager 82 can operate. The fabric interface 81 and the request queue manager 82 together form the request manager. The request queue manager 82 writes the data to a DRAM controller 83, which then communicates the data to the external shared DRAM memory 92 and ultimately to the NVRAM. The request queue manager 82 also provides information to the ZBT controller 84, which acts as an interface with the external shared SRAM memory 85.

The request queue manager 82 communicates with the message queue manager 85, that acts as a hub for all messages between the various components of the system. Messages from the message queue manager 85 are provided to the fast path uP interface 86 that communicates with the external inode manager and the disk manager. The disk manager is formed from a BMAP-read processor and a BMAP-write processor. The disk manager is broken up into a read processor and a write processor to better distribute the work load. The message queue manager 85 communicates with the cache controller, that in turn interfaces with the external cache state DRAM 95.

The message queue controller 85 and the cache data DRAM controller 93 communicate with the directory manager 87 to obtain information regarding data stored in external memories. The message queue controller 85 also communicates with a slow path interface 88 that communicates with an external blade control processor 89 for maintenance of the system. The fiber channel manager 90 communicates with the fiber channels 91 that extend externally from the chip 94 for the transfer of data to and from the disk and inodes. The request queue manager 82 also communicates with the cache data DRAM controller 93 that interfaces with the cache data memory 96.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for serving a file system request of a client from a network comprising:
    a file server for processing the file system request, the file server includes functional units, the functional units each perform an associated function and are separated by the function they perform, the functional units able to send messages to each other, the functional units include a request manager, an inode manager, a disk manager, and a cache controller;
    permanent storage in which at least a portion of the request is stored, the permanent storage includes a disk array, the file server sends an acknowledgement to the client through the network that the portion of the request that has been received by the file server from the network has been stored but before the request has been stored in the disk array;
    nonvolatile memory in which the portion of the request is stored until the portion can be stored in permanent storage, the nonvolatile memory includes nonvolatile RAM;
    a first power source for providing electricity to the disk array, the nonvolatile RAM and the file server, the first power source in electrical communication with the disk array, the nonvolatile RAM and the file server; and
    a second power source that provides electricity only to the nonvolatile RAM when the first power source fails, the second power source in electrical communication with the nonvolatile RAM, the second power source includes batteries.

2. An apparatus as described in claim 1 wherein the request manager and the inode manager operate independent of each other to process their respective functions without waiting for responses from each other.

3. An apparatus as described in claim 2 wherein the file server receives data of the request in any order from the network and prevents the data from being incorrectly over written in the nonvolatile RAM when the data has been received out of order, and the first power source has failed before the data is stored in the nonvolatile RAM.

4. An apparatus as described in claim 3 wherein the request manager separates write data from any other information of the request received from the client and sends the write data to the nonvolatile RAM.

5. An apparatus as described in claim 4 wherein the inode manager processes the request from the client.

6. An apparatus as described in claim 5 wherein the disk manager manages the disk array and writes or reads the data to or from the disk array.

7. An apparatus as described in claim 6 wherein the cache controller manager manages at least portions of files stored in the nonvolatile RAM but not saved in the disk array.

8. An apparatus as described in claim 7 wherein the functional units are ASICs.

9. A method for serving a file system request of a client from a network comprising the steps of:
    processing the file system request with a file server, the file server includes functional units, the functional units each perform an associated function and are separated by the function they perform, the functional units able to send messages to each other, the functional units include a request manager, an inode manager, a disk manger and a cache controller, the processing step includes the step of processing the request with the file server that includes processors and ASICs, the ASICs each perform a function and are separated by the function they perform, the ASICs able to send messages to each other;
    storing at least a portion of the request in nonvolatile RAM until the operation can be stored in permanent storage;
    storing the portion of the request in at least one disk of a disk array of permanent storage;
    providing electricity to the disk array, the nonvolatile RAM, and the file server, with a first power in electrical communication with the disk array, the nonvolatile RAM and the file server; and
    providing electricity only to the nonvolatile RAM when the first power source fails, with a second power source, in electrical communication with the nonvolatile RAM, with batteries, the request manager has a private list that identifies the data in the order a write request from a client is completed by the receiver, the private list is used by the request manager to ensure the data is restored in the order in the nonvolatile RAM even if the requests were processed out of order, and the first power source has failed before the data is written to the nonvolatile RAM.

10. An apparatus for transmitting data of a client from a network comprising:
    a plurality of disks that together comprise a disk array for storing the data;
    a memory for storing the data until the data is stored in the disk array, the memory includes a NVRAM;
    a receiver for receiving the data from the network and sending an acknowledgement that the data has been stored to the client through the network but before the data has been stored in the disk array, the receiver in communication with the memory, the receiver in communication with disk array, the receiver includes a request manager which separates the data from other information received from the client, and sends the data to the NVRAM, the receiver receives data in any order from the client and prevents the data from being incorrectly overwritten in the memory when the data has been received out of order, and a first power source has failed before the data is stored in the memory; the first power source for providing electricity to the disk, the memory and the receiver, the first power source in electrical communication with the disk, the memory and the receiver; and
    a second power source that provides electricity to the memory when the first power source fails, the second power source in communication with the memory, the request manager has a private list that identifies the data in the order a write request from a client is completed by the receiver, the private list is used by the request manager to ensure the data is restored in the order in the memory even if the requests were processed out of order, and the first power source has failed before the data is written to the memory.

11. An apparatus as described in claim 10 wherein the receiver includes an inode manager that processes requests from clients.

12. An apparatus as described in claim 11 wherein receiver includes a disk manager which manages the disk array and writes or reads the data to or from the disk array.

13. An apparatus as described in claim 12 wherein the receiver includes a cache controller which manages at least portions of files stored in the memory but not saved in the disk array.

14. An apparatus as described in claim 13 wherein the NVRAM holds a tail of a log file disposed in the disk array which tracks all changes to file system metadata to assure proper reconstruction of the data when there is a failure of the first power source.

15. An apparatus as described in claim 14 wherein the NVRAM comprises NVRAM buffers, NVRAM descriptors and a restoration register.

16. An apparatus as described in claim 15 wherein the NVRAM buffers store the data as it is received from a client; the NVRAM descriptors record information relevant to the recovery of data in its associated NVRAM buffer; the free list of NVRAM buffers; and the restoration register holds a head and count of the free list.

17. An apparatus as described in claim 16 wherein the second power source includes a battery.

18. An apparatus as described in claim 17 wherein the request manager assigns a request number to a file system request that is received by the receiver from the client from the network, the request number identifies the request.

19. A method for transmitting data of a client from a network comprising steps of:

receiving the data out of order from the network at an apparatus powered by a first power source;

sending an acknowledgement to the client that the data has been stored in a disk array of the apparatus through the network but before the data has been stored in the disk array;

storing the data in a memory that is powered by a second power source when the first power source fails so the data will not be lost if the first power source fails until the data is stored in the disk array; and storing the data in the disk array including the step of receiving the data out of order; and the storing step includes the step of preventing the data being incorrectly overwritten in the memory when the data has been received out of order, and the first power source has failed before the data is stored to the memory, the receiving step includes the step of maintaining a private list by a request manager of the apparatus that identifies the data in the order a write request is completed by the apparatus and is used by the request manager to ensure data is restored in the order in the memory even if the requests were processed out of order, and the first power source has failed before the data is written to the disk array.

20. A method as described in claim 19 wherein the storing the data in the memory step includes the step of storing write data in NVRAM.

21. A method as described in claim 20 wherein the receiving step includes the step of separating the write data from other information received from the client through the network.

22. A method as described in claim 21 wherein the receiving step includes the steps of assigning a request number to a request associated with the data and dequeuing enough NVRAM buffers to hold the write data.

* * * * *